(12) United States Patent
Kamijima et al.

(10) Patent No.: US 8,198,573 B2
(45) Date of Patent: Jun. 12, 2012

(54) LIGHT SOURCE DEVICE WITH LIGHT SCATTERING UNIT AND IMAGE DISPLAY APPARATUS HAVING A SPECIAL LIGHT MODULATING DEVICE

(75) Inventors: Shunji Kamijima, Hara-mura (JP); Kiyoto Sudo, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 360 days.

(21) Appl. No.: 12/367,767

(22) Filed: Feb. 9, 2009

(65) Prior Publication Data
US 2009/0243494 A1    Oct. 1, 2009

(30) Foreign Application Priority Data

Mar. 27, 2008   (JP) .................. 2008-082865

(51) Int. Cl.
    *H01L 27/00* (2006.01)
(52) U.S. Cl. ...................... 250/208.1; 353/85
(58) Field of Classification Search ............ 250/216, 250/208.1, 239, 205; 353/85, 99, 122; 362/295
    See application file for complete search history.

(56) References Cited

U.S. PATENT DOCUMENTS

| | | | | |
|---|---|---|---|---|
| 6,953,251 B2 * | 10/2005 | Seki et al. | ......... | 353/85 |
| 7,172,295 B2 * | 2/2007 | Engle | ............. | 353/85 |

FOREIGN PATENT DOCUMENTS

| | | |
|---|---|---|
| JP | A-6-309685 | 11/1994 |
| JP | A-8-339259 | 12/1996 |
| JP | A-2002-267967 | 9/2002 |
| JP | A-2007-233218 | 9/2007 |
| WO | WO 2008/023306 A1 | 2/2008 |

OTHER PUBLICATIONS

Mooradian, A. et al. *"High Power Extended Vertical Cavity Surface Emitting Diode Lasers and Arrays and Their Applications,"* Micro-Optics Conference, Nov. 2, 2005, Tokyo, Japan.

Office Action issued on Mar. 13, 2012 in corresponding Application No. 2008-082865.

\* cited by examiner

*Primary Examiner* — Que T Le
(74) *Attorney, Agent, or Firm* — Oliff & Berridge, PLC

(57) ABSTRACT

A light source device includes: a plurality of light emission units which emit light; a scattering unit which scatters at least a part of light received from the plural light emission units; a light detecting unit which detects a part of light emitted from the plural light emission units and scattered by the scattering unit; and a control unit which controls the plural light emission units based on detection result from the light detecting unit.

14 Claims, 8 Drawing Sheets

LIGHT SOURCE DEVICE WITH LIGHT SCATTERING UNIT AND IMAGE DISPLAY APPARATUS HAVING A SPECIAL LIGHT MODULATING DEVICE

BACKGROUND

1. Technical Field

The present invention relates to a light source device and an image display apparatus, and more particularly to a technology of a light source device having a plurality of light emission units.

2. Related Art

Recently, a solid light source used for the purpose of illumination has been developed and improved. A light source device including the solid light source has advantages such as preferable color rendition, long life, and immediate turning on and off. Thus, an image display apparatus such as projector including the solid light source as light source has been proposed. Currently, a technology of the light source device having the solid light source which performs automatic power control (APC) for controlling outputs is known (for example, see JP-A-6-309685 and JP-A-2002-267967). According to the technology proposed in JP-A-6-309685, a light receiving element is provided around a light emission window of a light source housing through which light emitted from a semiconductor laser is released in a structure including the semiconductor laser within the light source housing, and the output from the semiconductor laser is controlled according to the detection result from the light receiving element. According to the technology proposed in JP-A-2002-267967, lights sequentially emitted from a plurality of semiconductor lasers are detected by time-division system to control the outputs from the respective semiconductor lasers. By stabilizing the output from the light source device under the APC, a projector can display stable images having desired brightness.

For displaying images by using the solid light source currently developed, light is supplied using a plurality of light mission units in some cases so as to obtain a sufficient light amount. When the plural light emission units are collectively driven, it is preferable that the outputs from all the light emission units are collectively detected for the output control of the light source device. For example, when a part of light emitted from the plural light emission units is detected by using the technology disclosed in JP-A-6-309685, or when light from the plural light emission units is branched for detection, there is a possibility that light having intensity exceeding the detection limit of the light receiving element enters the light receiving element. When the light having intensity higher than the detection limit enters the light receiving element, the output is difficult to be kept constant. This problem becomes larger as the output of the solid light source increases. On the other hand, the technology disclosed in JP-A-2002-267967 does not successively detect the combined outputs from the respective light emission units. Thus, this technology is difficult to be employed by the structure including the plural light emission units. According to the known technologies, therefore, it is difficult to obtain a stable light amount in some cases when light is supplied from the plural light emission units.

SUMMARY

It is an advantage of some aspects of the invention to provide a light source device capable of obtaining a stable light amount when supplying light using a plurality of light emission units, and an image display apparatus including the light source device.

A light source device according to a first aspect of the invention includes: a plurality of light emission units which emit light; a scattering unit which scatters at least a part of light received from the plural light emission units; a light detecting unit which detects a part of light emitted from the plural light emission units and scattered by the scattering unit; and a control unit which controls the plural light emission units based on detection result from the light detecting unit.

The scattering unit scatters light received from the plural light emission units to supply respective parts of the light emitted from the light emission units to the light detecting unit. The light detecting unit collectively detects the entire outputs from the respective light emission units. By scattering the light emitted from the plural light emission units using the scattering unit, light having reduced intensity can be supplied to the light detecting unit. When the light source device has the plural light emission units, the intensity of light emitted from the light source device increases. When the intensity of light exceeds the dynamic range of a light receiving device in direct measurement of the light having high intensity by using the light detecting unit, the APC is difficult to be performed in an appropriate manner. According to the light source device in this aspect of the invention, however, light emitted from the plural light emission units is mixed and scattered, and then monitored by the light detecting unit. Thus, light having intensity allowed to be detected by the light detecting unit can be supplied to the light detecting unit, and the output from the light source device can be kept constant. Accordingly, the amount of light emitted from the light source device supplying light by using the plural light emission units can be stabilized.

It is preferable that an optical element which reflects a part of light received from the plural light emission units and transmits another part of the light is provided. According to this structure, the intensity of light supplied to the light detecting unit can be effectively attenuated by appropriately setting the reflectance and transmissivity of the optical element.

It is preferable that the scattering unit absorbs at least a part of received light. According to this structure, the scattering unit can further attenuate the intensity of light by scattering a part of light received from the plural light emission units and absorbing another part of the light.

It is preferable that the light detecting unit is disposed in such a position as to receive respective parts of light emitted from the light emission units and scattered by the scattering unit. According to this structure, the entire outputs from the respective light emission units can be collectively detected.

It is preferable that the scattering unit converges a part of scattered light. According to this structure, light emitted from the plural light emission units and scattered by the scattering unit can be supplied to the light detecting unit.

It is preferable that the scattering unit is a reflecting and scattering unit which has a reflection surface for reflecting received light to scatter the light. According to this structure, light supplied to the reflection surface can be scattered, and a part of the light scattered by the reflection surface can be directed toward the light detecting unit.

It is preferable that the reflecting surface has a concave shape. According to this structure, a part of light scatted by the reflection surface can be converged.

It is preferable that the reflecting and scattering unit achieves multiple reflection of received light. According to this structure, light received from the plural light emission units can be scatted in the space for multiple reflection within the reflection structure.

It is preferable that the scattering unit is a transmitting and scattering unit which transmits received light to scatter the light. According to this structure, light emitted from the plural light emission units can be scattered.

It is preferable that the scattering unit has a convex boundary surface. According to this structure, a part of light scatted by the scattering unit can be converged by refraction on the boundary surface.

It is preferable that a wavelength conversion element which converts wavelength of light emitted from the plural light emission units is provided. In this case, the wavelength conversion element functions as the transmitting and scattering unit. According to this structure, light scatted by the wavelength conversion element can be efficiently used, and the structure of the light source device can be simplified by giving the function of the scattering unit to the wavelength conversion element.

It is preferable that a plurality of the scattering units are provided. According to this structure, the intensity of light supplied to the light detecting unit can be further decreased.

It is preferable that a heat release unit disposed on the scattering unit to release heat is provided. According to this structure, the light source device can be efficiently cooled by providing the heat release unit on the scattering unit which receives light.

A light source device according to a second aspect of the invention includes: a plurality of light emission units which emit light; an absorbing unit which absorbs at least a part of light received from the plural light emission units; a light detecting unit which detects a part of light received from the plural light emission units; and a control unit which controls the plural light emission units based on detection result from the light detecting unit. The absorbing unit can supply light having reduced intensity to the light detecting unit by absorbing a part of the light received from the plural light emission units. Since the light intensity is decreased, light having intensity which does not exceed the dynamic range of the light receiving device can be monitored by the light detecting unit. Thus, the amount of light emitted from the light source device using the plural light emission units for light emission can be stabilized.

An image display apparatus according to a third aspect of the invention includes the light source device described above to display an image using light emitted from the light source device. In the structure including the light source device described above, bright light can be supplied using the plural light emission units, and the amount of light is stabilized. Thus, images displayed by the image display apparatus become bright with stable amount of light.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments according to the invention are hereinafter described with reference to the drawings.

First Embodiment

Figure 1:
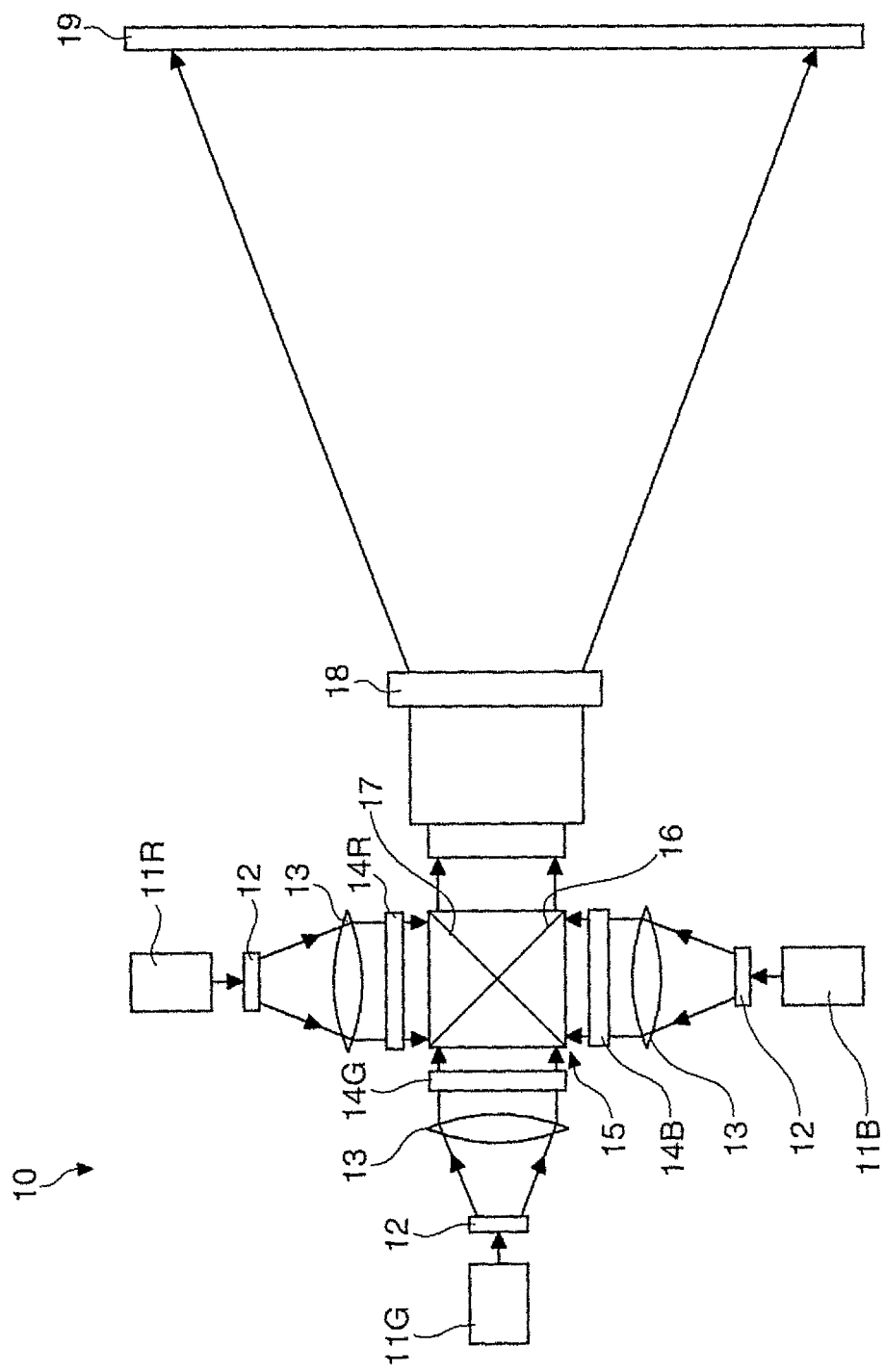
FIG. 1 schematically illustrates a projector according to a first embodiment of the invention.

FIG. 1 schematically illustrates a projector 10 according to a first embodiment of the invention. A projector 10 is a front projection type projector which projects light on a screen 19 and forms images to be viewed by using light reflected by the screen 19. The projector 10 includes a red (R) light source device 11R, a green (G) light source device 11G, and a blue (B) light source device 11B. The projector 10 is an image display apparatus which displays images using the color lights emitted from the respective light source devices 11R, 11G, and 11B.

The R light source device 11R is a light source device for emitting R light. A diffusion element 12 shapes and enlarges an illumination area and equalizes the light amount distribution in the illumination area. The diffusion element 12 is constituted by computer generated hologram (CGH) as diffraction optical element, for example. A field lens 13 collimates light emitted from the R light source device 11R and supplies the collimated light to an R spatial light modulating device 14R. The R spatial light modulating device 14R is a spatial light modulating device which modulates R light according to image signals, and is constituted by a transmission type liquid crystal display device. The R light modulated by the R spatial light modulating device 14R enters a cross dichroic prism 15 as a color combining system.

The G light source device 11G is a light source device for emitting G light. Light having passed through the diffusion element 12 and the field lens 13 enters a G spatial light modulating device 14G. The G spatial light modulating device 14G is a spatial light modulating device which modulates G light according to images signals and is constituted by a transmission type liquid crystal display device. The G light modulated by the G spatial light modulating device 14G enters the cross dichroic prism 15 via a surface different from the surface through which the R light enters.

The B light source device 11B is a light source device for emitting B light. Light having passed through the diffusion element 12 and the field lens 13 enters a B spatial light modulating device 14B. The B spatial light modulating device 14B is a spatial light modulating device which modulates B light according to images signals and is constituted by a transmission type liquid crystal display device. The B light modulated by the B spatial light modulating device 14B enters the cross dichroic prism 15 via a surface different from the surfaces through which the R and G lights enter. The transmission type liquid crystal display device is a high temperature polysilicon (HTPS) TFT liquid crystal panel, for example.

The cross dichroic prism 15 has two dichroic films 16 and 17 disposed substantially orthogonal to each other. The first dichroic film 16 reflects R light and transmits G and B lights. The second dichroic film 17 reflects B light and transmits R and G lights. The cross dichroic prism 15 combines the R light, G light, and B light entering in different directions, and releases the combined light toward a projection lens 18. The projection lens 18 projects the light combined by the cross dichroic prism 15 toward the screen 19.

Figure 2:
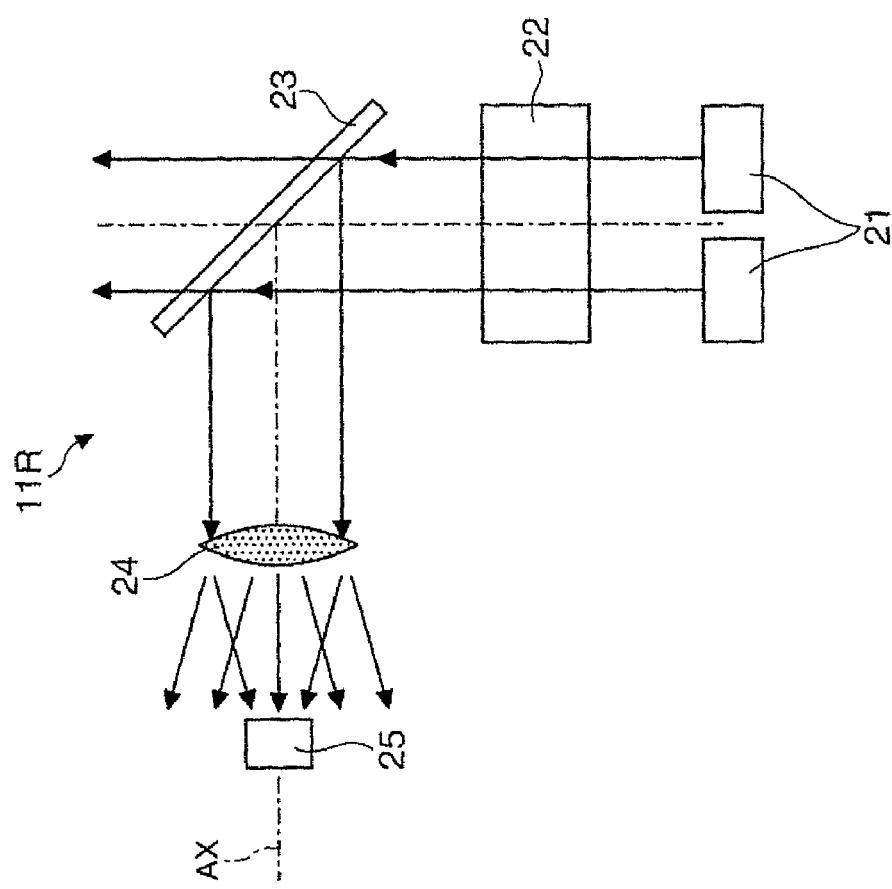
FIG. 2 schematically illustrates an R light source device.

FIG. 2 schematically illustrates the structure of the R light source device 11R. The R light source device 11R, the G light source device 11G, and the B light source device 11B have similar structure except that the wavelengths of the lights emitted from the respective light source devices 11R, 11G and 11B are different. The structure of the R light source device 11R is discussed herein as an example. The R light source device 11R has two semiconductor elements 21. Each of the semiconductor elements 21 has a light emission unit. The light emission unit emits fundamental light having first wavelength. The semiconductor element 21 is an end surface emission type semiconductor element, for example. The semiconductor elements 21 are disposed such that the chief rays of the lights emitted from the respective light emission units travel substantially parallel with each other. An optical axis Ax is an axis substantially parallel with the chief rays of the lights emitted from the respective light emission units and positioned between the respective chief rays.

A second-harmonic generation (SHG) element 22 receives fundamental light emitted from the respective semiconductor elements 21 and releases fundamental light and higher harmonic light having second wavelength. The SHG element 22 functions as wavelength conversion element for converting the wavelength of light emitted from the light emission units of the respective semiconductor elements 21. The second wavelength corresponds to half of the first wavelength. The SHG element 22 is constituted by periodically poled lithium niobate (PPLN) of lithium niobate ($LiNbO_3$) as non-linear optical crystal, for example.

A light separating unit 23 separates fundamental light from higher harmonic light by reflecting the first wavelength light and transmitting the second wavelength light received from the SHG element 22. The light separating unit 23 is produced by coating a transparent material as a parallel flat plate with a wavelength selecting film such as dielectric multilayer film. The wavelength selecting film is provided on the light entrance surface of the light separating unit 23 through which light from the SHG element 22 enters. The light separating unit 23 is disposed such that the entrance surface is inclined to the optical axis AX at approximately 45 degrees.

A transmitting and scattering unit 24 is disposed at the position receiving the first wavelength fundamental light reflected by the light separating unit 23. The transmitting and scattering unit 24 is a scattering unit which transmits light received from the light separating unit 23 to scatter the light. The transmitting and scattering unit 24 is produced by dispersing scattering materials for scattering light in a transmitting component. The transmitting and scattering unit 24 has a convex lens shape. The transmitting and scattering unit 24 has the convex shape on both the boundary surface for receiving light and the boundary surface for releasing light. The transmitting and scattering unit 24 converges a part of the scattered light. The center axis passing the center positions of the two boundary surfaces of the transmitting and scattering unit 24 substantially coincides with the optical axis AX. It is only required that at least either the entrance side boundary surface or the exit side boundary surface of the transmitting and scattering unit 24 has the convex shape.

A light detecting unit 25 detects a part of the light scattered by the transmitting and scattering unit 24. The light detecting unit 25 is constituted by a light receiving element which converts received light into electronic signal such as photodiode. The light detecting unit 25 is disposed at a position receiving respective parts of light emitted from the respective semiconductor elements 21 and scattered by the transmitting and scattering unit 24, such as a position on the optical axis AX. The light detecting unit 25 may be disposed at a position other than on the optical axis AX as long as respective parts of the light emitted from the respective semiconductor element 21 and scattered by the transmitting and scattering unit 24 can enter the position.

The fundamental light emitted from the light emission units of the respective semiconductor elements 21 travels such that the chief rays become substantially parallel with each other, and enters the SHG element 22. A part of the fundamental light having entered the SHG element 22 is converted into higher harmonic light by the SHG element 22. The higher harmonic light released from the SHG element 22 passes through the light separating unit 23 and is released to the outside of the R light source device 11R. The fundamental light not converted into higher harmonic light by the SHG element 22 and released therefrom is reflected by the light separating unit 23 such that the optical path is bended at approximately 90 degrees. The fundamental light reflected by the light separating unit 23 is scattered by passing through the transmitting and scattering unit 24. A part of the light scattered by the transmitting and scattering unit 24 is converged by the converging operation of the transmitting and scattering unit 24 and enters the light detecting unit 25.

Figure 3:
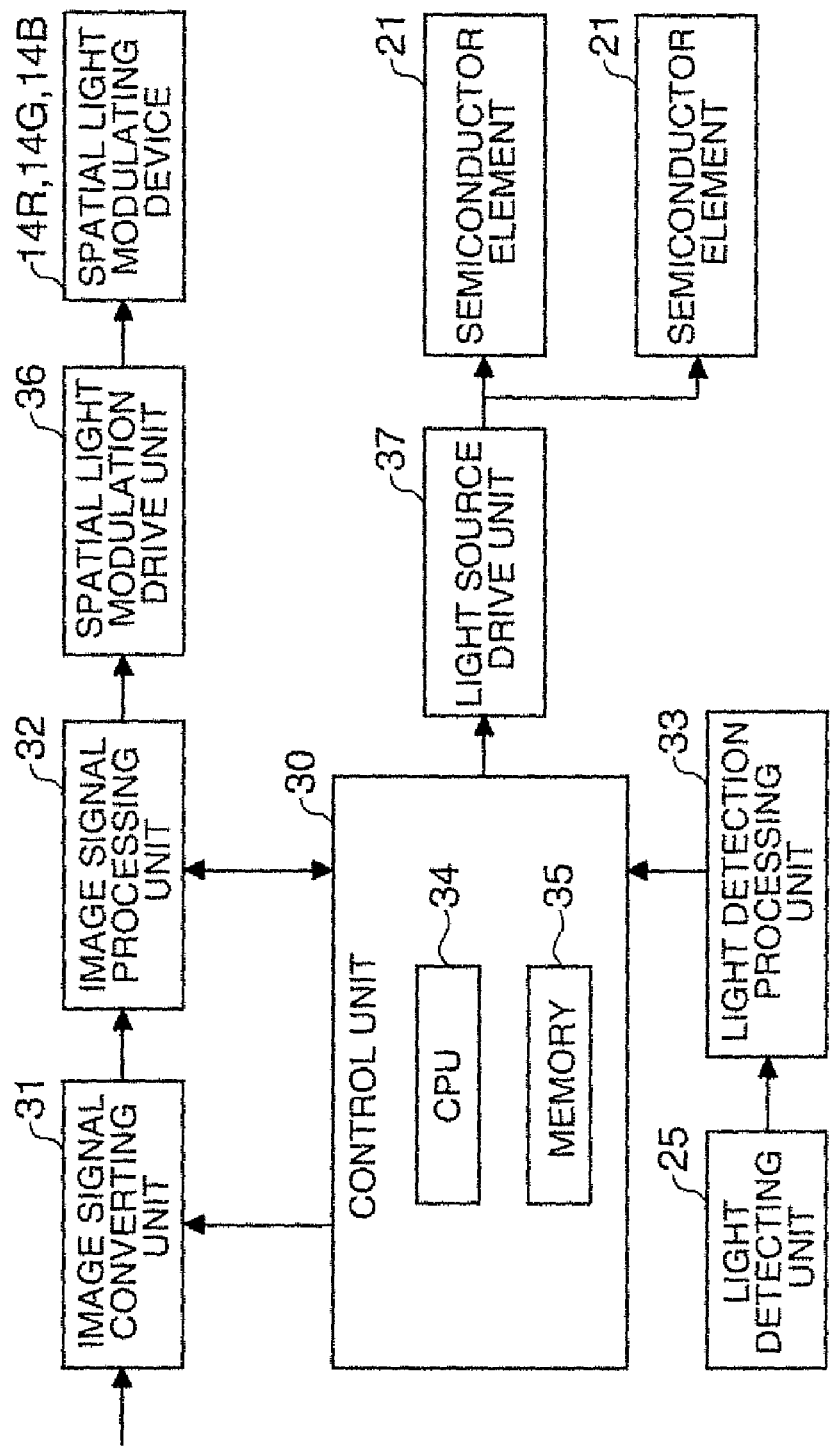
FIG. 3 is a block diagram showing a structure for controlling drive of the projector.

FIG. 3 is a block diagram showing the structure for controlling the drive of the projector 10. A control unit 30 includes a CPU (central processing unit) 34 and a memory 35, and functions as a computer. The memory 35 is constituted by flash ROM (read only memory) or the like. The control unit 30 operates the CPU 34 according to a control program stored in the memory 35 to control the drive of the projector 10. An image signal converting unit 31 converts image signals inputted from an external device or the like into signals allowed to be processed by an image signal processing unit 32. The image signal converting unit 31 converts image signals under the control of the control unit 30. For example, the image signal converting unit 31 converts image signals inputted as analog signals into digital signals.

The image signal processing unit 32 applies processes for various types of image quality control to the image signals converted by the image signal converting unit 31. Examples of the processes for image quality control include resolution conversion for converting the resolution such that the resolution can be matched with the pixel numbers of the spatial light modulating devices 14R, 14G, and 14B, luminance adjustment, contract adjustment, sharpness adjustment, and other processes. The image signal processing unit 32 sets target outputs of the respective light source devices 11R, 11G, and 11B. A spatial light modulation drive unit 36 drives the spatial light modulating devices 14R, 14G, and 14B according to the image signals processed by the image signal processing unit 32. A light source drive unit 37 is connected with the respective semiconductor elements 21 of the light source devices 11R, 11G, and 11B. The two semiconductor elements 21 of each of the light source devices 11R, 11G, and 11B are connected in series or in parallel. The light source drive unit 37 collectively drives the two semiconductor elements 21.

A light detection processing unit 33 sets drive conditions of the respective semiconductor elements 21 for each color according to electronic signals from the light detecting units 25 provided on the light sources 11R, 11G, and 11B. The control unit 30 controls the drive of the respective semiconductor elements 21 according to the target outputs set by the image signal processing unit 32 and the drive conditions set by a light detection processing unit 33. Thus, the control unit 30 controls the plural light emission units based on the detection results from the light detecting units 25. The drive of the light source devices 11R, 11G, and 11B for emitting light from respective semiconductor elements 21 is feedback-controlled based on the detection result from the light detecting unit 25. The projector 10 stabilizes the outputs from the light source devices 11R, 11G, and 11B under the APC.

Respective parts of the light emitted from the semiconductor elements 21 and scattered by the transmitting and scattering unit 24 enter the light detecting unit 25. The light detecting unit 25 collectively detects the outputs from the semiconductor element 21 at the position receiving the respective parts of the light from the semiconductor elements 21. The light emitted from the plural light emission units is scattered by the transmitting and scattering unit 24 such that the intensity of the light decreases in entering the light detecting unit 25. Since the light having intensity allowed to be detected by the light detecting unit 25 is supplied to the light detecting unit 25, the outputs from the light source devise 11R, 11G, and 11B can be kept constant. In this case, the amount of light supplied from the plural light emission units is stabilized. Thus, the projector 10 can display bright images having stable light amount. The APC can be performed for each of the light emission units by integrating and monitoring the outputs from the respective light emission units. When deteriorations of the respective light emission units vary or when the light amount changes by failure of any of the light emission units, for example, the outputs from the respective light emission units are stabilized by the APC for the light emission units. Power consumption loss can be reduced by maintaining the optimum outputs from the respective light emission units.

Each of the light source devices 11R, 11G, and 11B is not limited to the structure including the two semiconductor elements 21, but may have three or more semiconductor elements 21. The respective semiconductor elements 21 are connected in series, in parallel, or in series-parallel, and the light source drive unit 37 collectively drives the connected semiconductor elements 21. Each of the light source devices 11R, 11G, and 11B may be a surface emission type semiconductor element having a plurality of light emission units.

The projector 10 is not limited to the structure including the transmission type liquid crystal display devices as the spatial light modulating devices. The spatial light modulating device may be reflection type liquid display device (liquid crystal on silicon; LCOS), DMD (digital micromirror device), GLV (grating light valve), or the like. The projector 10 is not limited to the structure including the spatial light modulating device for each color. The projector 10 may have one spatial light modulating device which modulates two, three or more colors. The projector 10 is not limited to the structure including the spatial light modulating devices. The projector 10 may be a laser scan type projector which applies laser beams emitted from the light source device for scanning by using scanning unit such as galvano-mirror or the like and displays images on a light receiving surface. The projector 10 may be a slide projector which uses a slide containing image information. The image display apparatus according to the first aspect of the invention may be a so-called rear projector which supplies light to one surface of the screen and forms images to be viewed by the light released from the other surface of the screen.

Second Embodiment

Figure 4:
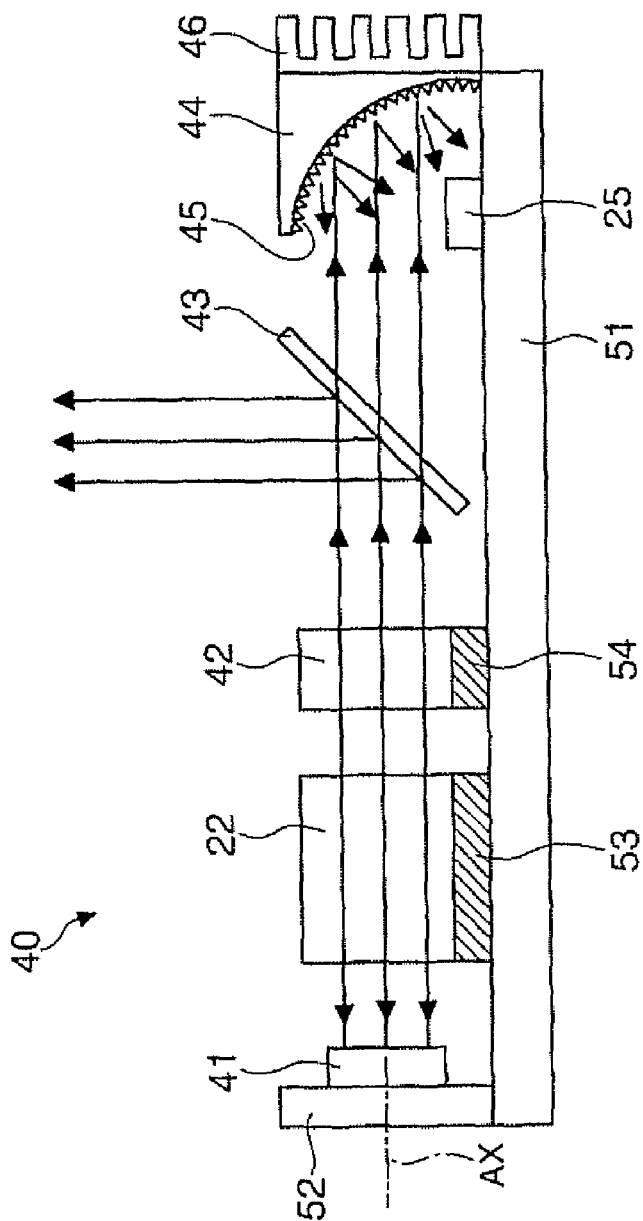
FIG. 4 schematically illustrates a light source device according to a second embodiment of the invention.

FIG. 4 schematically illustrates a light source device 40 according to a second embodiment of the invention. The light source device 40 according to this embodiment is included in the projector 10 in the first embodiment. The light source device 40 in this embodiment is characterized by containing a concave mirror 44 as a reflecting and scattering unit for scattering light by reflection. Similar reference numbers are given to parts similar to those in the first embodiment, and the same explanation is not repeated. A semiconductor element 41 is attached to a supporting unit 52. The semiconductor element 41 is a surface light emission type semiconductor element having three light emission units (not shown) for emitting fundamental light having the first wavelength. The chief rays of light emitted from the respective light emission units of the semiconductor element 41 are substantially parallel with each other. The semiconductor element 41 has a not-shown mirror layer for reflecting the first wavelength light. The support unit 52 is positioned on a base 51. The SHG element 22 is provided on an SHG element mount 53. The SHG element mount 53 is positioned on the base 51. The SHG element 22 may be directly provided on the base 51 without using the SHG element mount 53.

An external resonator 42 resonates fundamental light received from the semiconductor element 41 between the mirror layer of the semiconductor element 41 and the external resonator 42. The external resonator 42 is a narrow band reflection mirror having reflection characteristics for providing half width of several nanometers around the first wavelength in the infrared range. The external resonator 42 transmits light having wide wavelength range containing the second wavelength in the visible range. The external resonator 42 is constituted by VHG (volume holographic grating) as volume hologram, for example. The VHG is formed by photo-refractive crystal such as $LiNbO_3$ and BGO, polymer or the like. The external resonator 42 is provided on a resonator mount 54. The resonator mount 54 is disposed on the base 51. The external resonator 42 may be directly provided on the base 51 without using the resonator mount 54.

A light separating unit 43 is a wide band reflection mirror which reflects visible light in the wavelength range containing the second wavelength and transmits infrared light. The light separating unit 43 is produced by coating a transparent component as parallel flat plate with wavelength selection film such as dielectric multilayer film. The wavelength selection film is provided on the entrance surface of the light separating unit 43 for receiving light from the external resonator 42. The light separating unit 43 is disposed such that the entrance surface is inclined to the optical axis at approximately 45 degrees.

The concave mirror 44 is provided on the base 51. The concave mirror 44 has a reflection surface 45 for reflecting light having passed through the light separating unit 43. The reflection surface 45 has concave shape. The reflection surface 45 scatters light received from the light separating unit 43 by reflecting the light. The concave mirror 44 functions as a scattering unit for scattering light received from the plural light emission units. The reflection surface 45 is constituted by small structures for reflecting light provided on the concave surface formed on the base. The reflection surface 45 may be produced by providing a reflection film on the concave surface of the base and forming small concaves and convexes on the surface of the reflection film. The concave mirror 44 converges a part of the light scatted by the reflection surface 45.

The light detecting unit 25 is provided on the base 51. The light detecting unit 25 is disposed at a position receiving respective parts of light emitted from the respective light emission units and scattered by the concave mirror 44, such as a position at which the respective chief rays emitted from the respective light emission units and bended by the reflection surface 45 cross one another. The base 51 is a flat-plate-shaped component made of metal such as copper. A heat sink 46 is provided on a surface of the concave mirror 44 other than the reflection surface 45. The heat sink 46 functions as a heat releasing unit for releasing heat. By providing the heat sink 46 on the concave mirror 44 receiving light, the light source device 40 can be efficiently cooled.

The fundamental light emitted from the semiconductor element 41 enters the SHG element 22. Higher harmonic light produced from fundamental light having entered the SHG element 22 from the semiconductor element 41 passes through the external resonator 42 and enters the light separating unit 43. The higher harmonic light reflected by the light separating unit 43 is released to the outside of the light source device 40. The fundamental light whose wavelength not converted by the SHG element 22 is released from the SHG element 22 and supplied to the external resonator 42. The fundamental light reflected by the external resonator 42 enters the SHG element 22. The fundamental light having entered the SHG element 22 from the external resonator 42 and passed through the SHG element 22 enters the semiconductor element 41. The fundamental light having entered the semiconductor element 41 is reflected by the mirror layer of the semiconductor element 41 and travels toward the SHG element 22. The fundamental light reflected by the semiconductor element 41 and the external resonator 42 is resonated with fundamental light newly emitted from the light emission units of the semiconductor element 41 and amplified thereby.

The semiconductor element 41 emits light in the wavelength range around the first wavelength. The infrared light contained in the light from the semiconductor element 41 and having wavelength out of the wavelength range allowed to be reflected by the external resonator 42 passes through the external resonator 42. The light having passed through the external resonator 42 further passes through the light separating unit 43. The light having passed through the light separating unit 43 enters the concave mirror 44. The light having entered the concave mirror 44 is reflected by the reflection surface 45 and scattered. A part of the light scattered by the reflection on the reflection surface 45 is converged by the converging operation of the reflection surface 45 and supplied to the light detecting unit 25.

The light emitted from the plural light emission units and scatted by the reflection surface 45 to have decreased intensity enters the light detecting unit 25. The light source device 40 according to this embodiment acquires stable light amount similarly to the light source device in the first embodiment. The light separating unit 43 may have a structure which transmits visible light in the wavelength range containing the second wavelength and reflects infrared light. In this case, the concave surface mirror 44 is provided at a position receiving infrared light reflected by the light separating unit 43. The light source device having the transmitting and scattering unit in other embodiment may have a heat releasing unit on the transmitting and scattering unit for scattering received light by transmission.

The concave mirror 44 may have low reflectance. Since the concave mirror 44 has low reflectance, the light reflected by the low reflectance concave mirror 44 and traveling toward the light detecting unit 25 can be attenuated. The concave mirror 44 scatters a part of light received from the plural light emission units and absorbs another part of the light. The light absorbed by the concave mirror 44 is converted into heat. The heat accumulated on the concave mirror 44 is released by the heat sink 46. Since the reflectance of the concave mirror 44 is decreased, light can be effectively attenuated. The concave mirror 44 may be at least either the type scattering light from the plural light emission units or the type absorbing the light for attenuation, or may be the type which only absorbs the light for attenuation.

Third Embodiment

Figure 5:
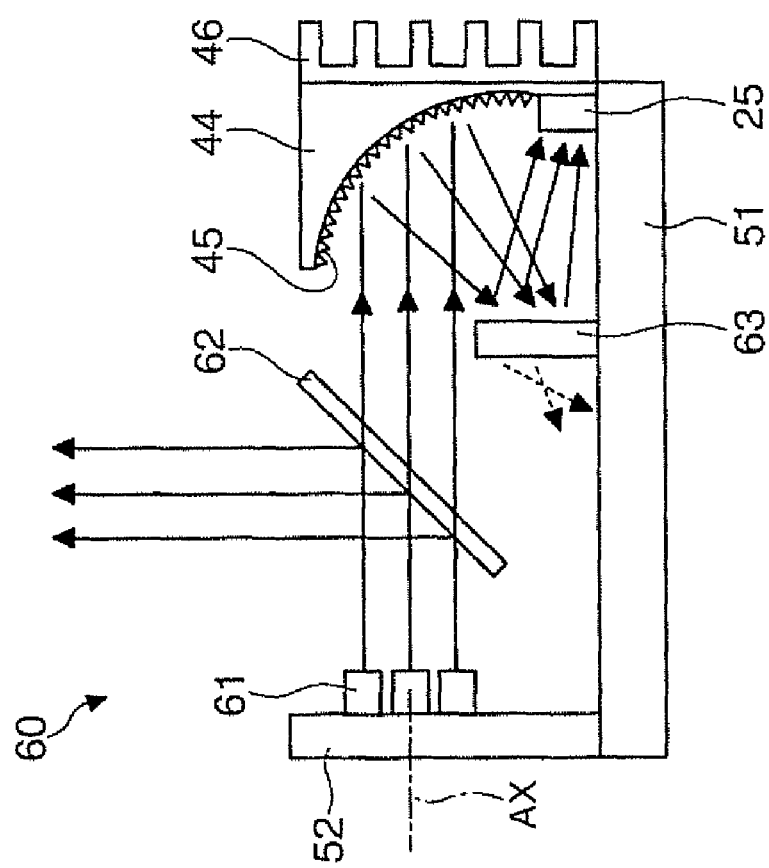
FIG. 5 schematically illustrates a light source device according to a third embodiment of the invention.

FIG. 5 schematically illustrates a light source device 60 according to a third embodiment of the invention. The light source device 60 according to this embodiment is included in the projector 10 in the first embodiment. The light source device 60 in this embodiment is characterized by including a glass plate 63 disposed at a position receiving a part of light scattered by the concave mirror 44. Similar reference numbers are given to parts similar to those in the first embodiment, and the same explanation is not repeated.

The light source device 60 has three semiconductor elements 61. The semiconductor elements 61 are attached to the supporting unit 52. Each of the semiconductor elements 61 has a light emission unit (not shown) for emitting laser beam as visible light. A light separating unit 62 is an optical element which reflects a part of light received from the semiconductor elements 61 and transmits another part of the light to separate the light received from the semiconductor elements 61. The light separating unit 62 is formed by coating a transparent component as parallel flat plate with dielectric multilayer film, for example. Light reflected by the light separating unit 62 is released to the outside of the light source device 60. The light having passed through the light separating unit 62 enters the concave mirror 44. It is preferable that the light separating unit 62 has low transmissivity and high reflectance. Since the light separating unit 62 has high reflectance, light from the semiconductor elements 61 can travel to the outside of the light source device 60 with high efficiency. Since the light separating unit 62 has low transmissivity, light entering the concave mirror 44 can be effectively attenuated.

The concave mirror 44 may have low reflectance. Since the concave mirror 44 has low reflectance, the light reflected by the low reflectance concave mirror 44 and traveling toward the light detecting unit 25 can be attenuated. The concave mirror 44 scatters a part of light received from the plural light emission units and absorbs another part of the light. The light absorbed by the concave mirror 44 is converted into heat. The heat accumulated on the concave mirror 44 is released by the heat sink 46. Since the reflectance of the concave mirror 44 is decreased, light can be effectively attenuated. The concave mirror 44 may be at least either the type scattering light from the plural light emission units or the type absorbing the light for attenuation, or may be the type which only absorbs the light for attenuation.

A glass plate 63 is disposed at a position of the base 51 for receiving light converged by the concave mirror 44. The glass plate 63 is an optical element which transmits most of received light and reflects a small part of received light. The glass plate 63 is a parallel flat plate made of glass material. The light detecting unit 25 is disposed at a position of the base 51 for receiving light reflected by the glass plate 63.

Most of the light entering the glass plate 63 from the concave mirror 44 passes through the glass plate 63. Only a part of the light entering the glass plate 63 from the concave mirror 44 is reflected by the glass plate 63 and enters the light detecting unit 25. Since the light reflected by the glass plate 63 having low reflectance enters the light detecting unit 25, the intensity of the light entering the light detecting unit 25 can be effectively decreased. Moreover, light can be attenuated at low cost by using the glass plate 63 not requiring coating such as dielectric multilayer film. The light source device 60 may have component having low reflectance in place of the glass plate 63.

The light source device 60 may have an optical element having low transmissivity in lieu of the glass plate 63. In this case, the light source device 60 supplies light having passed through the optical element to the light detecting unit 25. This structure can effectively reduce the intensity of the light entering the light detecting unit 25 in the similar manner. The light source device 60 may have a scattering unit which transmits or reflects light to scatter the light in place of the glass plate 63. The light source device 60 may have a scattering unit in addition to the concave mirror 44 functioning as a scattering unit to scatter light by using the plural scattering units. The intensity of the light entering the light detecting unit 25 can be effectively decreased by scattering the light using the plural scattering units.

The light source device 60 may have a structure which directs light having passed through the light separating unit 62 to the outside of the light source device 60 and supplies light reflected by the light separating unit 62 to the concave mirror 44. In this case, the light separating unit 62 includes an optical element having high transmissivity and low reflectance. The optical element having high transmissivity and low reflectance is constituted by glass plate, for example. By using the glass plate not requiring coating such as dielectric multilayer film, light can be separated at low cost.

Fourth Embodiment

Figure 6:
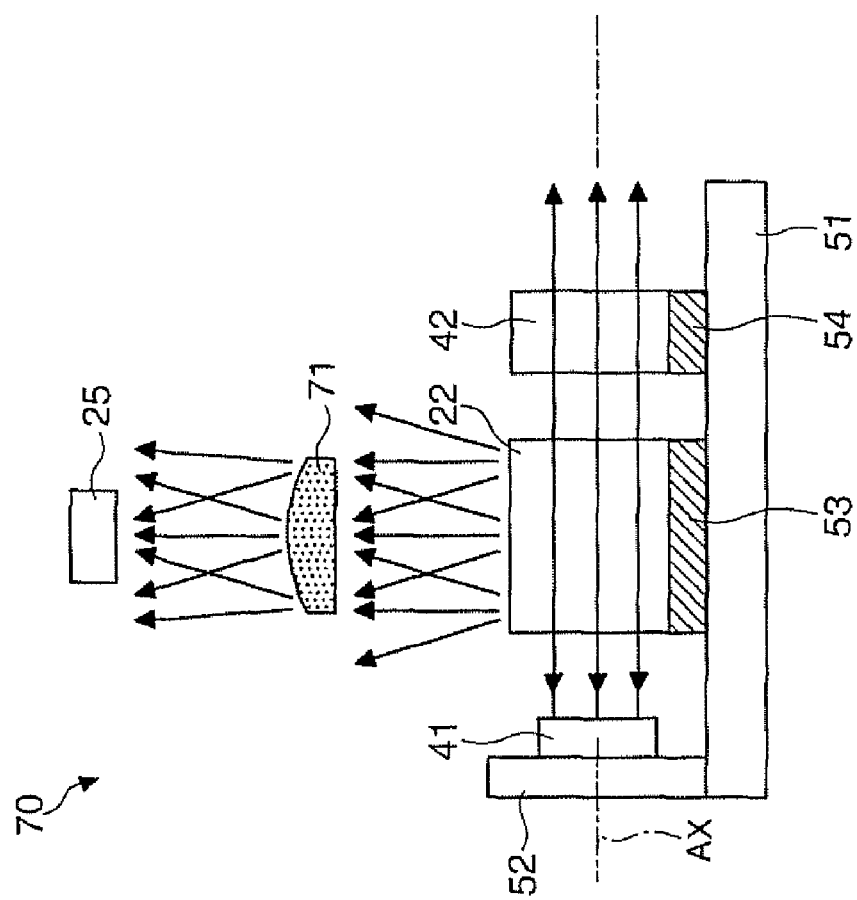
FIG. 6 schematically illustrates a light source device according to a fourth embodiment of the invention.

FIG. 6 schematically illustrates a light source device 70 according to a fourth embodiment of the invention. The light source device 70 in this embodiment is included in the projector 10 in the first embodiment. The light source device 70 in this embodiment is characterized by detecting light scattered by the SHG element 22. Similar reference numbers are given to parts similar to those in the first embodiment, and the same explanation is not repeated. Higher harmonic light having passed through the external resonator 42 is released to the outside of the light source device 70.

Under the normal condition, higher harmonic light generated by the SHG element 22 travels substantially parallel with the optical axis AX or partially scatters around the SHG element 22. In this embodiment, the SHG element 22 functions as scattering unit which scatters light received from the respective semiconductor elements 41. A transmitting and scattering unit 71 is disposed in the vicinity of the SHG element 22. The transmitting and scattering unit 71 receives a part of the light scattered by the SHG element 22. The transmitting and scattering unit 71 is a scattering unit which transmits light received from the SHG element 22 to scatter the light. Thus, the light source device 70 has two components functioning as scattering units. The light releasing boundary surface of the transmitting and scattering unit 71 has a convex shape. The transmitting and scattering unit 71 converges a part of the scattered light. It is only required that at least either the light entrance side boundary surface or the light exit side boundary surface has a convex shape. The light detecting unit 25 detects a part of the light scattered by the transmitting and scattering unit 71.

The light source device 70 can effectively decrease the intensity of light entering the light detecting unit 25 by scattering the light using the SHG element 22 and the transmitting and scattering unit 71. The light source device 70 is not limited to the structure including two components functioning as scattering units, but may have three or more components functioning as scattering units.

Fifth Embodiment

Figure 7:
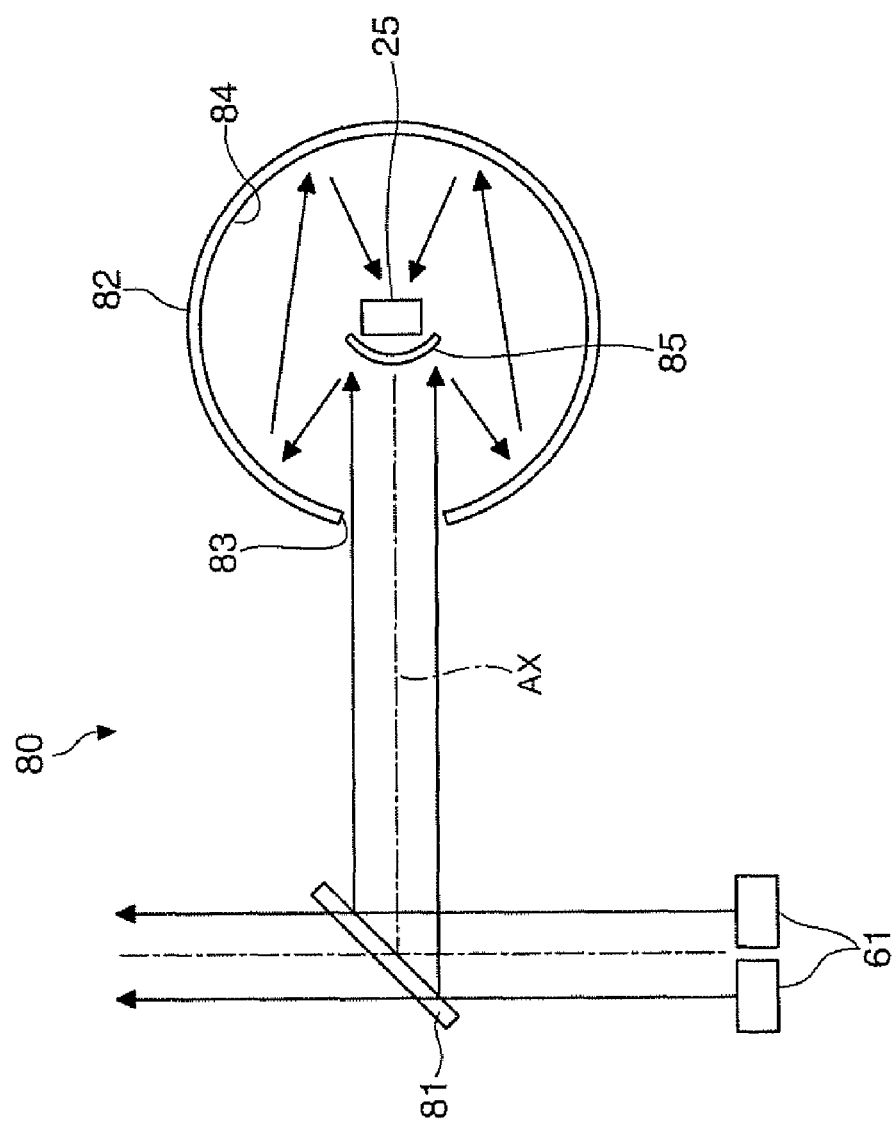
FIG. 7 schematically illustrates a light source device according to a fifth embodiment of the invention.

FIG. 7 schematically illustrates a light source device 80 according to a fifth embodiment of the invention. The light source device 80 in this embodiment is included in the projector 10 in the first embodiment. The light source device 80 in this embodiment is characterized by including an integrating sphere 82. Similar reference numbers are given to parts similar to those in the first embodiment, and the same explanation is not repeated. A light separating unit 81 is an optical element which reflects a part of light received from the semiconductor element 61 and transmits another part of the light to separate the light received from the semiconductor element 61. The light separating unit 81 is an optical element having high transmissivity and low reflectance such as glass plate.

Light having passed through the light separating unit 81 travels to the outside of the light source device 80. The light reflected by the light separating unit 81 travels toward the integrating sphere 82. The light separating unit 81 having high transmissivity can efficiently releases the light from the respective semiconductor elements 61 to the outside of the light source device 80. The light separating unit 81 having low reflectance can effectively attenuate the light entering the integrating sphere 82. The glass plate requiring no coating such as dielectric multilayer film can separate light at low cost. The light separating unit 81 may be an optical element having low transmissivity and high reflectance. In this case, the light source device 80 has a structure for directing light reflected by the light separating unit 81 to the outside of the light source device 80 and supplies light having passed through the light separating unit 81 to the integrating sphere 82.

The integrating sphere 82 is a hollow sphere. An opening 83 is formed at a position of the integrating sphere 82 for receiving light from the light separating unit 81. A reflection surface 84 is provided on the entire inner surface of the integrating sphere 82. The integrating sphere 82 functions as reflecting and scattering unit for achieving multiple reflection of light having entered the interior through the opening 83. A convex mirror 85 is disposed at a position of the interior of the integrating sphere 82 for receiving light having passed through the opening 83. The convex mirror 85 has a convex shape. The convex mirror 85 diffuses the received light inside the integrating sphere 82. The light detecting unit 25 is disposed in the vicinity of the convex mirror 85 on the side of the convex mirror 85 opposite to the side receiving light through the opening 83.

The light having passed through the opening 83 and reached the interior of the integrating sphere 82 enters the convex mirror 85. The light reflected by the convex mirror 85 travels toward a reflection surface 84 and scatters inside the integrating sphere 82 by multiple reflection on the reflection surface 84. The light detecting unit 25 detects a part of the light scatted inside the integrating sphere 82. The intensity of light entering the light detecting unit 25 can be effectively reduced by scattering light from the plural light emission units within the integrating sphere 82. Light from the semiconductor elements 61 is uniformly detected by equalizing the light from the semiconductor elements 61 inside the integrating sphere 82. The position of the light detecting unit 25 is not limited to the position discussed above but may be any position other than the position directly receiving the light having passed through the opening 83. The light detecting unit 25 may be provided on the inner surface of the integrating sphere 82, for example. The light source device 80 is not limited to the structure having the integrating sphere 82, but may be any structure capable of achieving multiple reflection of light. The reflecting and scattering unit may be a component of any shape which is hollow and has a reflecting surface inside the component.

Figure 8:
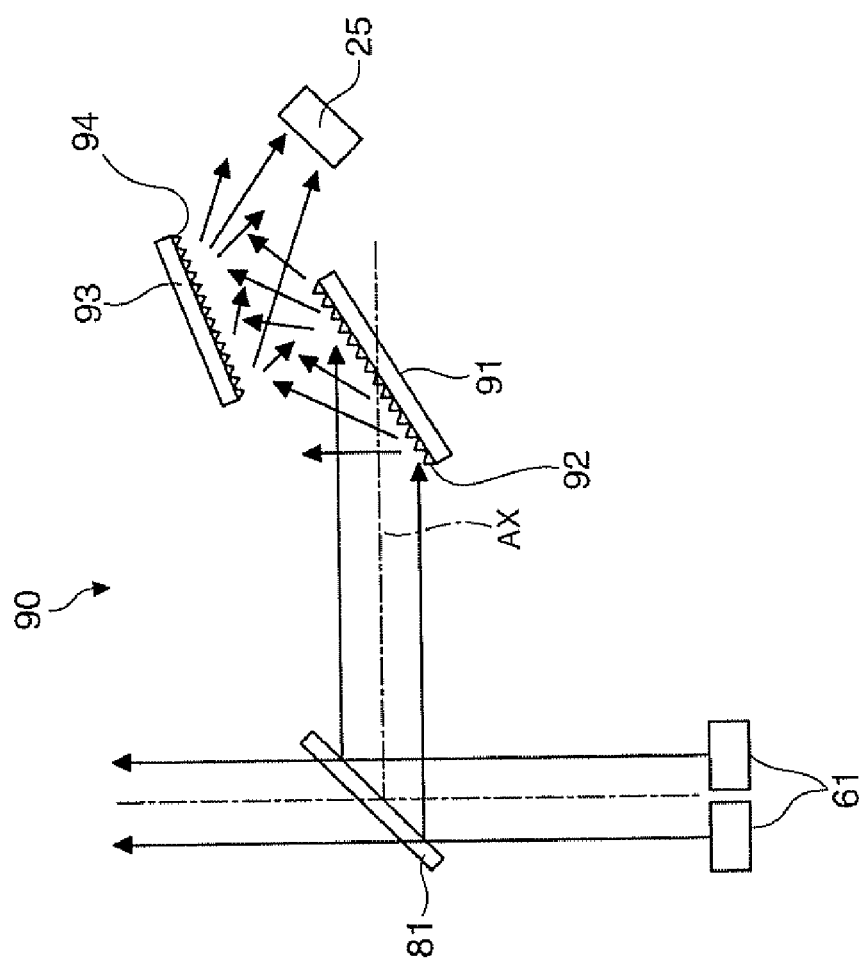
FIG. 8 schematically illustrates a light source device according to a modified example of the fifth embodiment.

FIG. 8 schematically illustrates a light source device 90 according to a modified example of this embodiment. The light source device 90 in this modified example is characterized by including a first flat mirror 91 and a second flat mirror 93. The first flat mirror 91 and the second flat mirror 92 function as reflecting and scattering units for achieving multiple reflection of light. The first flat mirror 91 has a reflection surface 92. The reflection surface 92 is produced by providing small parts for reflecting light on a flat surface. The first flat mirror 91 reflects light received from the light separating unit 81 by the reflection surface 92 to scatter the light.

The second flat mirror 93 has a function similar to that of the first flat mirror 91. The second flat mirror 93 is disposed in such a position that a part of light scattered by the first flat mirror 91 is supplied to a reflection surface 94. The second flat mirror 93 reflects light received from the first flat mirror 91 by the reflection surface 94 to scatter the light. The reflection surfaces 92 and 94 may be produced by providing small concaves and convexes on the surface of the reflection film. The light detecting unit 25 detects a part of the light scattered by the second flat mirror 93. The light detecting unit 25 is disposed at a position at which respective parts of light received from the semiconductor elements 61 and scattered by the first flat mirror 91 and the second flat mirror 93 overlap with one another, such as a position on the optical axis AX when the optical axis AX is bended on the reflection surfaces 92 and 94.

The intensity of light entering the light detecting unit 25 can be effectively decreased by scattering light from the plural light emission units by the first flat mirror 91 and the second flat mirror 93. The light source device 90 is not limited to the structure which achieves multiple reflection of light by the first flat mirror 91 and the second flat mirror 93. At least either the first flat mirror 91 or the second flat mirror 93 may be replaced with a concave mirror to converge a part of the scattered light. The number of the flat mirrors or the concave mirrors functioning as reflecting and scattering unit is not limited to two but may be three or more. The reflecting and scattering unit may have low reflectance. Since the reflecting and scattering unit has low reflectance, the light reflected by the reflecting and scattering unit and traveling toward the light detecting unit 25 can be attenuated. The reflecting and scattering unit scatters a part of the light received from the plural light emission units and absorbs another part of the light. Since the reflecting and scattering unit has reduced reflectance, light can be effectively attenuated.

Accordingly, the light source device according to the invention is appropriately used when included in the image display apparatus.

The entire disclosure of Japanese Patent Application NO. 2008-082865, filed Mar. 27, 2008 is expressly incorporated by reference herein.

What is claimed is:

1. An image display apparatus comprising:
   a plurality of light emission units which emit light;
   a scattering unit which scatters at least a part of the light emitted from the plurality of light emission units;
   a light detecting unit which detects a part of the light emitted from the plurality of light emission units and scattered by the scattering unit;
   a special light modulating device, which modulates light not detected by the light detecting unit; and
   a control unit which controls the plurality of light emission units based on a detection result from the light detecting unit.

2. The image display apparatus according to claim 1, further comprising an optical element which reflects a part of the light emitted from the plurality of light emission units and transmits another part of the light emitted from the plurality of light emission units.

3. The image display apparatus according to claim 1, wherein the scattering unit absorbs at least a part of the light emitted from the plurality of light emission units.

4. The image display apparatus according to claim 1, wherein the light detecting unit is disposed in such a position so as to receive respective parts of the light emitted from the plurality of light emission units and scattered by the scattering unit.

5. The image display apparatus according to claim 1, wherein the scattering unit converges a part of the scattered light.

6. The image display apparatus according to claim 1, wherein the scattering unit is a reflecting and scattering unit which has a reflection surface for reflecting received light to scatter the received light.

7. The image display apparatus according to claim 6, wherein the reflection surface has a concave shape.

8. The image display apparatus according to claim 6, wherein the reflecting and scattering unit achieves multiple reflection of the received light.

9. The image display apparatus according to claim 1, wherein the scattering unit is a transmitting and scattering unit which transmits received light to scatter the received light.

10. The image display apparatus according to claim 9, wherein the scattering unit has a convex boundary surface.

11. The image display apparatus according to claim 9, further comprising:
    a wavelength conversion element which converts at least one wavelength of light emitted from the plurality of light emission units,
    wherein the wavelength conversion element functions as the transmitting and scattering unit.

12. The image display apparatus according to claim 1, further comprising a plurality of the scattering units.

13. The image display apparatus according to claim 1, further comprising a heat release unit disposed on the scattering unit to release heat.

14. An image display apparatus comprising:
    a plurality of light emission units which emit light;
    an absorbing unit which absorbs at least part of the light emitted from the plurality of light emission units;
    a light detecting unit which detects a part of light received from the plural light emission units;
    a special light modulating device, which modulates light not detected by the light detecting unit; and
    a control unit which controls the plural light emission units based on a detection result from the light detecting unit.

* * * * *